(12) United States Patent
Hirata (10) Patent No.: US 11,568,157 B2
(45) Date of Patent: Jan. 31, 2023

(54) SCANNER, CONTROL METHOD OF SCANNER, NON-TRANSITORY COMPUTER READABLE STORAGE MEDIUM, AND SCANNING SYSTEM

(71) Applicant: Fast Retailing Co., Ltd., Yamaguchi (JP)

(72) Inventor: Jun Hirata, Yamaguchi (JP)

(73) Assignee: Fast Retailing Co., Ltd., Yamaguchi (JP)

( * ) Notice: Subject to any disclaimer, the term of this patent is extended or adjusted under 35 U.S.C. 154(b) by 95 days.

(21) Appl. No.: 17/242,149

(22) Filed: Apr. 27, 2021

(65) Prior Publication Data
US 2021/0334485 A1    Oct. 28, 2021

(30) Foreign Application Priority Data
Apr. 28, 2020  (JP) .............................. JP2020-078972

(51) Int. Cl.
*G06K 7/10*       (2006.01)
*G06K 19/077*     (2006.01)
*G06F 3/14*       (2006.01)

(52) U.S. Cl.
CPC .......... *G06K 7/10366* (2013.01); *G06F 3/14* (2013.01); *G06K 19/07758* (2013.01); *G06K 2007/10504* (2013.01)

(58) Field of Classification Search
CPC ................ G06F 3/14; G06K 19/07758; G06K 2007/10504; G06K 7/10009; G06K 7/10366; G06Q 10/087
See application file for complete search history.

(56) References Cited

U.S. PATENT DOCUMENTS

| | | | |
|---|---|---|---|
| 2004/0181467 A1* | 9/2004 | Raiyani ................ | G06Q 10/087 705/28 |
| 2013/0082841 A1* | 4/2013 | Joseph ............... | G08B 13/2417 340/572.1 |
| 2013/0249736 A1* | 9/2013 | Nikitin .................. | G01S 5/0257 342/450 |
| 2020/0302380 A1* | 9/2020 | Nyswonger ........ | G06K 7/10366 |

FOREIGN PATENT DOCUMENTS

JP         2007-316897 A      12/2007
JP         2007316897 A    *  12/2007

\* cited by examiner

*Primary Examiner* — Omer S Khan
(74) *Attorney, Agent, or Firm* — Wolf, Greenfield & Sacks, P.C.

(57)         ABSTRACT

There is provided a scanner that scans a plurality of pieces of furniture on which products are arranged. The scanner includes a reading unit configured to read information from a tag attached to the product, an estimation unit configured to perform estimation processing of estimating which furniture the tagged products read by the reading unit belongs to, and a display control unit configured to display furniture for which the estimation processing is completed and furniture for which the estimation processing is not completed so as to be distinguished from each other.

12 Claims, 7 Drawing Sheets

SCANNER, CONTROL METHOD OF SCANNER, NON-TRANSITORY COMPUTER READABLE STORAGE MEDIUM, AND SCANNING SYSTEM

CROSS REFERENCE TO RELATED APPLICATION

The present application claims priority to Japanese Application No. 2020-078972, filed Apr. 28, 2020. The aforementioned application is hereby incorporated by reference herein.

BACKGROUND

Field of the Invention

The present disclosure relates to a guide technology for guiding a position of a product to a user.

Description of the Related Art

At clothing stores and household goods stores, various products are displayed in the stores. In the clothing stores and the like, there is known a technology for scanning the products and displaying positions of the products in order to grasp a layout of the products in the store. In such stores, especially the clothing stores, since a cycle of products is shorter than that in other fields and products in demand are different depending on the weather, it is necessary to frequently change the layout in the store. Thus, it is necessary to scan the product whenever the layout is changed, and thus, the scan needs to be efficiently performed.

JP 2007-316897 A discloses a technology for guiding a user to a specific product position by acquiring positional information of each product in advance by RFID scan and further acquiring positional information of the user who operates a smartphone.

However, with the above technology, since it is difficult to grasp which part of the store is scanned when a plurality of people share an operation of scanning the products in the store by using a plurality of scanners, the scanning work is not efficient.

SUMMARY

An embodiment of the present disclosure provides an advantageous technology for improving the efficiency of scanning a tag of a product displayed in a store.

According to some embodiments of the present invention, a scanner scans a plurality of pieces of furniture on which products are arranged. The scanner includes a reading unit configured to read information from a tag attached to the product, an estimation unit configured to perform estimation processing of estimating which furniture the tag read by the reading unit belongs to, and a display control unit configured to display furniture for which the estimation processing is completed and furniture for which the estimation processing is not completed so as to be distinguished from each other.

Further features of the present disclosure will become apparent from the following description of exemplary embodiments with reference to the attached drawings.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

Figure 1:
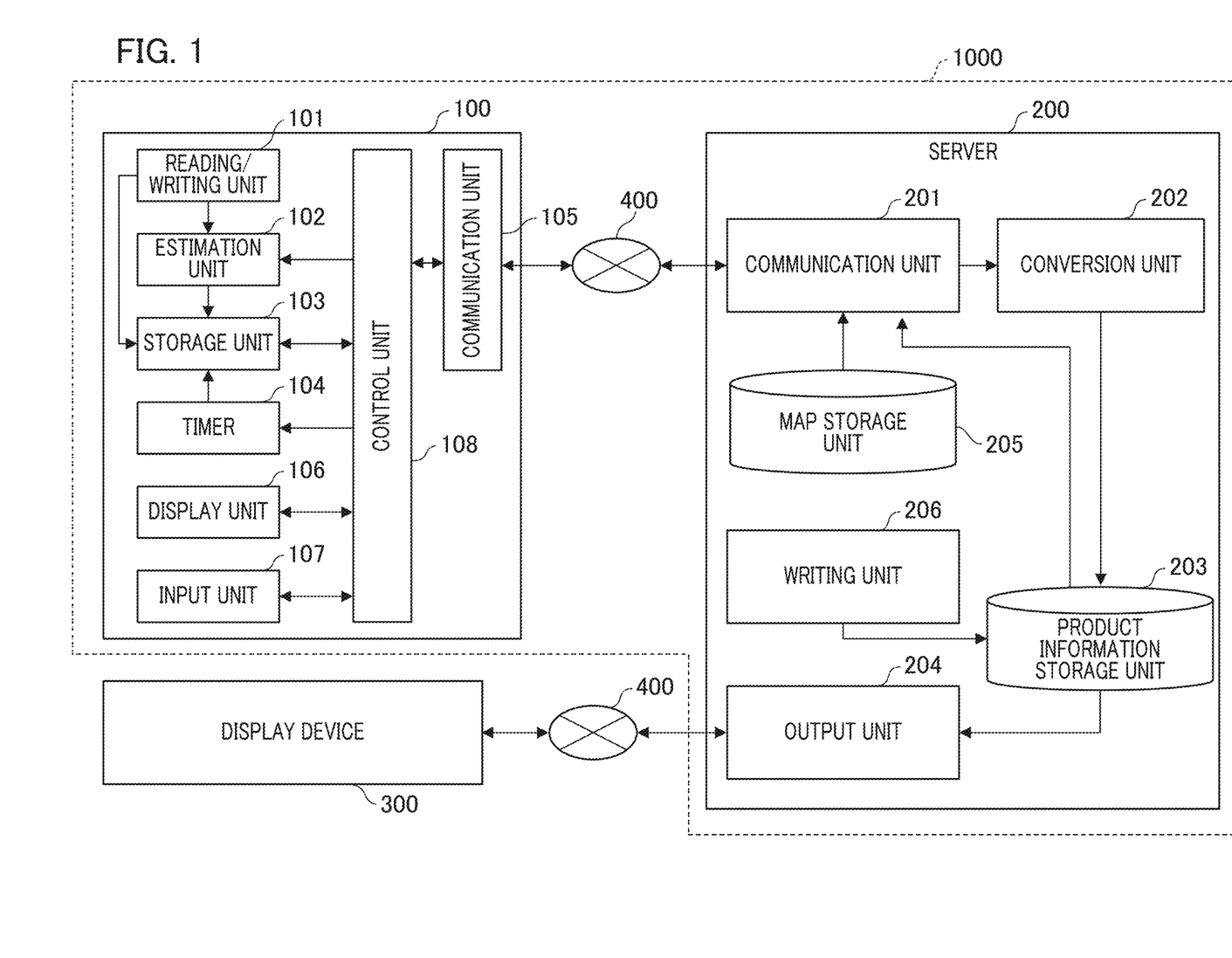
FIG. 1 is a configuration diagram showing a configuration of a scanning system including a scanner.

FIG. 1 is a configuration diagram showing a configuration of a scanning system 1000 including a scanner 100. The scanning system 1000 includes the scanner 100 and a server 200. These components are connected to be able to communicate via a network 400. The network 400 includes, for example, the Internet, a wide area network (WAN), a local area network (LAN), a wireless base station such as WiFi, a provider device, a dedicated line, and the like. The scanning system 1000 acquires a product position by scanning a tag attached to each product in a store by the scanner 100. The acquired product positional information is used for displaying on a display device 300.

Here, a case where the scanner 100 is a portable type reading terminal will be described as an example. The scanner 100 includes a reading/writing unit 101, an estimation unit 102, a storage unit 103, a timer 104, a communication unit 105, a display unit 106, an input unit 107, and a control unit 108.

The reading/writing unit 101 includes a plurality of antennas, reads pieces of identification information of products from tags of the products, and acquires pieces of relative positional information indicating positions of the tags relative to the scanner 100 by the plurality of antennas. Although reading resolution and accuracy are reduced, the reading/writing unit 101 may have only one antenna. When the tag of the product is read, the reading/writing unit 101 also reads identification information and relative positional information of furniture from tags arranged at each furniture installed in the store. The pieces of identification information of the tags arranged at each furniture are associated with the positional information of the furniture (absolute position in the store or on a floor map). When information can be written to the tag such as a read and write type, the reading/writing unit 101 writes information received from the server 200 such as information indicating that the tag is disposed in the store to the tag.

Here, the tag is a tag capable of recording the identification information of the product such as an RFID tag. For example, when the tag corresponds to RFID, the tag has an antenna and a chip that stores identification information therein and is attached to a package, or is fixed to a part of the product with a member called a rock. When radio waves of UHF-band reader and writer are received from an outside by the antenna in the tag, the radio wave is generated and information retained in an IC is output to the outside by the same UHF-band radio wave.

The estimation unit 102 compares the read relative positional information of the tag of each product with the read relative positional information of the tag of the furniture (furniture tag), and estimates which furniture each product belongs to. For example, when the furniture tag is disposed at a center position of a horizontal cross section of the furniture, the furniture corresponding to the furniture tag closest to each product may be determined as the furniture to which each product belongs. When the furniture tags are arranged at both ends or four corners of the furniture, the tag positioned substantially interposed between the furniture tags, or the tags positioned in a region having furniture tags, as four corners, may be determined as the tag belonging to the furniture corresponding to the furniture tag. The estimation unit 102 may estimate the absolute position of each product from the absolute position set on the tag of the furniture, the relative position of the tag of the furniture, and the relative position of each product.

The storage unit 103 stores a floor map (furniture map) showing the absolute positions of the pieces of furniture in the store. The storage unit 103 stores the read identification information of the product and the identification information of the furniture to which each product belongs (displayed) in association with each other. At this time, the storage unit 103 acquires a time (scan time) at which the identification information of each product is read from the timer 104 and stores the acquired time as an addition method (metadata) of the identification information of each product. The timer 104 measures the time with an internal counter and retains a date and time.

The communication unit 105 outputs the identification information of the product stored in the storage unit 103 in association with the identification information of at least one or more pieces of furniture to the server 200. Here, the communication unit 105 may also output each product absolute position to the server 200 when the estimation unit 102 estimates the absolute position of the tag read from the product, or may output the relative position of each product when the estimation unit 102 does not estimate the absolute position. When the storage unit 103 stores the time at which the identification information of the product is read, it is preferable to output the time as well.

The display unit 106 is, for example, a liquid crystal display panel, a plasma display panel, an organic EL display panel, or the like, and is controlled by the control unit 108. The display unit 106 displays the furniture map based on the control of the control unit 108.

The input unit 107 is, for example, a touch panel, a keyboard, a mouse, or the like that receives an operation input from a user, and receives instructions and inputs from the user by the touch panel and keys. The input unit 107 may also function as the display unit 106, and the display unit 106 and the input unit 107 may have an integrated structure.

The control unit 108 includes, for example, a CPU and a memory, and controls each unit of the scanner 100.

The server 200 includes a communication unit 201, a conversion unit 202, a product information storage unit 203, an output unit 204, a writing unit 205, and a map storage unit 206.

The communication unit 201 acquires the identification information for each product and the positional information of the tag read from the tag attached to each product by the scanner 100. Here, the identification information of the product includes at least color information and size information of the product. Of course, the size and the color may be replaced with pieces of corresponding information (numbers such as numerical values). For example, "S, M, L" may be replaced with "1, 2, 3", or "white, black, yellow" may be replaced with "00, 09, 45" for colors.

The conversion unit 202 converts the identification information acquired by the communication unit 201 and the positional information of the tag into positional information (display positional information) to be reflected on the floor map of the store.

The product information storage unit 203 stores the display positional information converted by the conversion unit 202 in association with the identification information. Here, the product information storage unit 203 may further store the display positional information in association with floor identification information for identifying a floor and a store.

The output unit 204 outputs the positional information corresponding to the identification information of the product designated by the user to the display device 300 in the display device 300.

The writing unit 205 writes, for example, information indicating that the product is disposed in the store or the like to the identification information of the product stored in the product information storage unit 203. The information written to the identification information of each product is output to the scanner 100 via the communication unit 201, and is written to the tag in the next scan. The information written to the tag may include, for example, information on the store where the tag is located or the like. When information cannot be written to the tag such as a read-only type, the product information storage unit 203 stores the identification information of the product in a state in which the information is written.

The map storage unit 206 retains layout information indicating an outline of a layout inside each store. The layout information is image data (pdf format or jpeg format) as a map that overviews outlines such as a location of the store (including a country name and a store name), a store number, a store type, an arrangement of walls and pieces of furniture (erectors) in the store, and positions of pillars, and positional information and orientation of the display device in the store. That is, the layout information includes the floor map (furniture map) showing the absolute positions of the pieces of furniture in the store, and the map storage unit 206 stores this floor map. The map storage unit 206 outputs the furniture map via the communication unit 201.

The display device 300 displays the positional information of the product designated by the user on a display screen based on the positional information of each product in the store acquired by the scanner 100. Accordingly, the user is guided to the product position. The display device 300 is, for example, a signage device installed inside or outside a store of a clothing selling store, a smartphone, a tablet terminal, a notebook personal computer (PC), a desktop PC, a mobile phone, or the like, or a mobile terminal of a customer. In the present specification, the mobile terminal means an information processing device that can be carried by the user such as a smartphone, a tablet terminal, a notebook PC, or a mobile phone.

Figure 2:
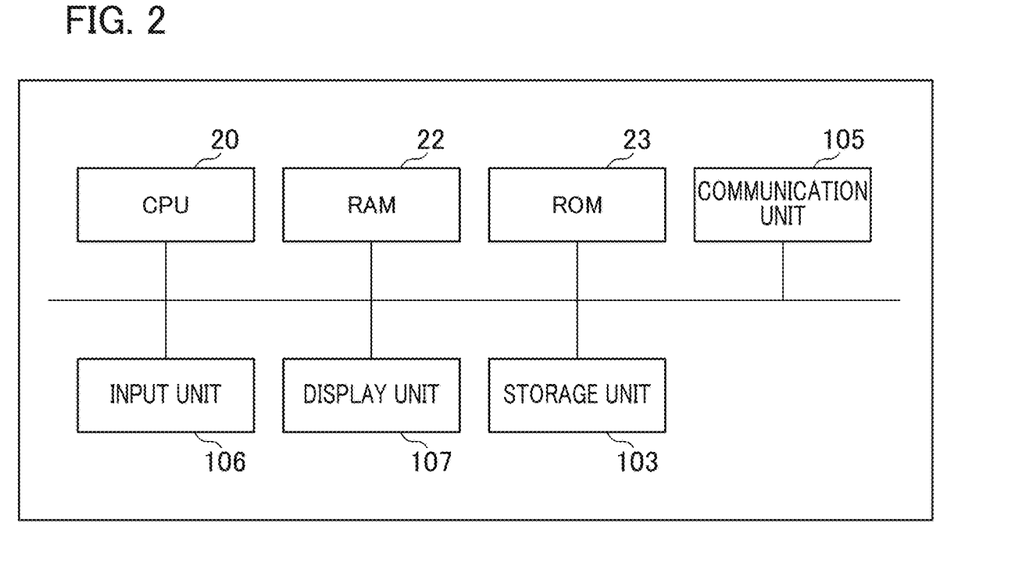
FIG. 2 is a block diagram showing a hardware configuration of the scanner.

FIG. 2 is a block diagram showing a hardware configuration of the scanner 100. The scanner 100 includes a storage unit 103, a CPU 21, a RAM 22, a ROM 23, a communication unit 105, a display unit 106, and an input unit 107.

The storage unit 103 stores a program that achieves a flow to be described later by being executed by the CPU 21 and data and the like used by this program.

The CPU 21 operates based on a program stored in the ROM 23 or the storage unit 20, and controls each unit of the scanner 100. The ROM 23 stores a boot program executed by the CPU 21 when the scanner 100 is activated, a program that depends on the hardware of the scanner 100, and the like. The CPU 21 expands the program of the ROM 23 into the RAM 22 and executes the expanded program. Thus, the CPU 21 achieves the flow to be described later. The CPU 21 may acquire these programs from another device via the network 400 and execute the programs, or may directly execute the programs stored in the ROM 23.

The communication unit 105 receives data from another device via the network 400 and transmits the data to the CPU 21, and transmits data and instructions generated by the CPU 21 to another device via the network 400. The server 200 and the display device 300 each have the same configuration as in FIG. 2, but detailed description thereof will be omitted.

Figure 3:
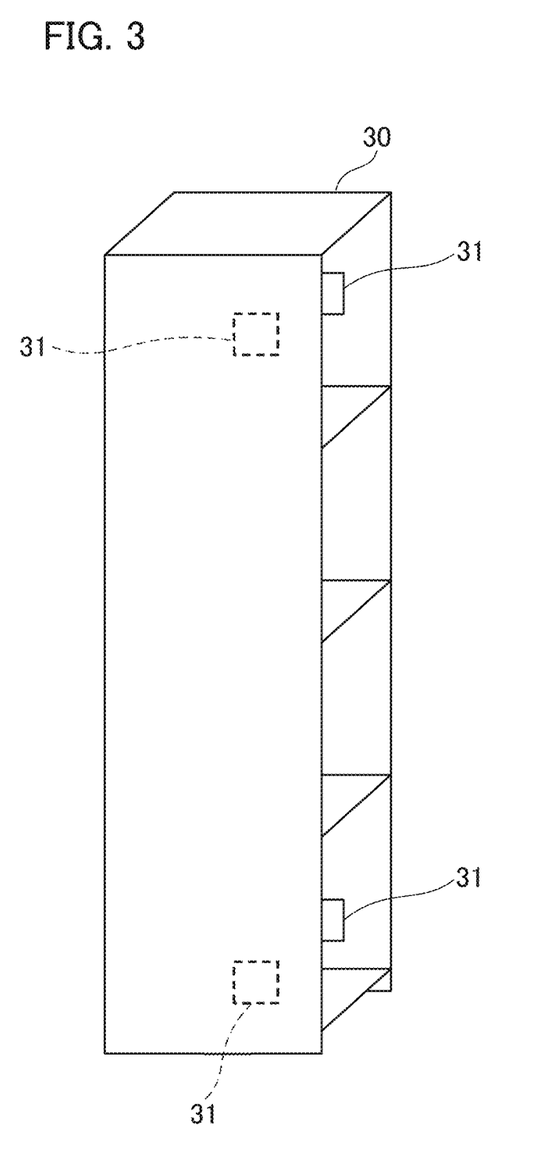
FIG. 3 is a schematic diagram showing a scene in which a plurality of RFID tags for furniture is attached to furniture.

FIG. 3 is a schematic diagram showing a scene in which a plurality of RFID tags 31 for furniture is attached to furniture 30. When the furniture 30 is a shelf sealed with a metal plate material, it is preferable to arrange the RFID tags in locations that are not easily visible from the outside. As for the RFID tags 31, as long as the accuracy of the display position of the product may be low, the number of tags per furniture 30 may be reduced. On the contrary, when the accuracy of the display position of the product is desired to be increased, the number of tags per furniture 30 may be increased (the coverage per tag may be reduced) and pieces of different identification information are embedded in the tags. Accordingly, it may be possible to distinguish where the read RFID tag 31 is disposed in the furniture 30.

Figure 4:
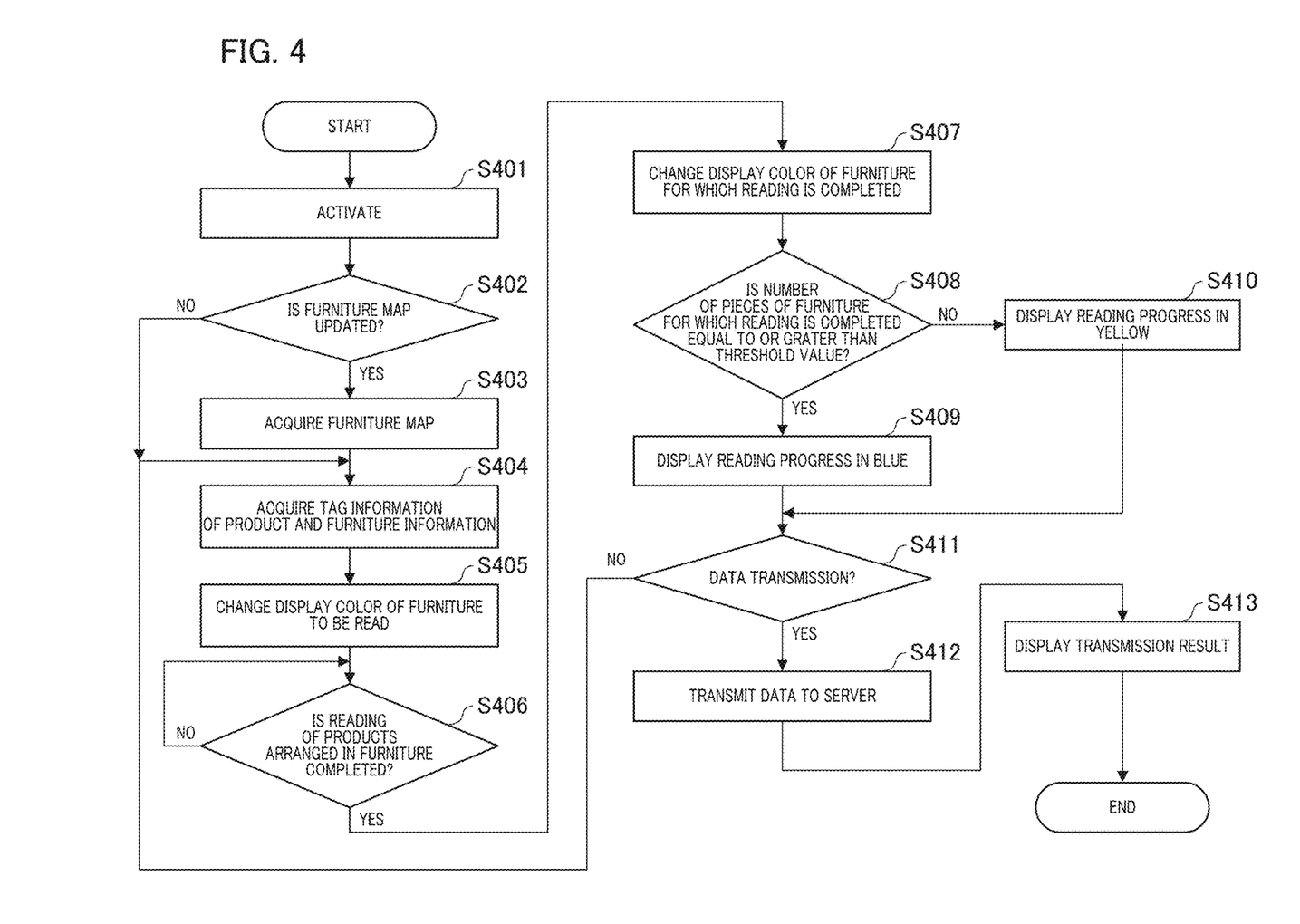
FIG. 4 is a flowchart illustrating output processing of identification information in the scanner.

FIG. 4 is a flowchart illustrating output processing of the identification information in the scanner 100. Each operation (step) shown in this flowchart can be executed by the control of each unit of the control unit 108. First, the user activates the scanner 100 (S401). The control unit 108 checks whether or not the furniture map stored in the server 200 is updated via the communication unit 105 (S402). For example, the control unit 108 compares the furniture map stored in the storage unit 103 with the furniture map stored in the server 200, and determines that the furniture map is updated when there is a difference. When the furniture map is updated in S402 (Yes), the control unit 108 acquires the latest furniture map from the server 200 and stores the acquired furniture map in the storage unit 103 (S403). On the other hand, when the furniture map is not updated in S402 (No), the processing proceeds to S404. When the furniture map is not updated, it is possible to further improve the efficiency of a scanning operation by omitting the acquisition of the furniture map.

Subsequently, the user carries the scanner 100 and moves inside the store. Accordingly, the reading/writing unit 101 acquires the identification information from the tag of the product displayed in the store, and simultaneously acquires the identification information of the furniture on which the product is displayed (S404). The read identification information of the product and the read identification information of the furniture are associated and stored in the storage unit 103.

Subsequently, the control unit 108 sets the color of the furniture (the furniture to be read) on which the product for which the reading of the tag information is currently being executed is disposed to be different from the colors of other pieces of furniture on the furniture map. In other words, the control unit 108 changes the display color of the furniture to be read to a color (second color) different from the color (first color) of the furniture for which the reading of the tag is not completed (reading incompletion furniture) on the furniture map (S405). The control unit 108 determines whether or not the acquisition of the identification information from the tags of 90% or more of the products, preferably all the products, arranged in the furniture to be read is completed (S406). When the acquisition of the identification information from the tags of the products arranged in the furniture to be read is not completed in S406 (No), S406 is repeated. On the other hand, when the acquisition of the identification information from the tags of the products arranged in the furniture to be read is completed in S406 (Yes), the control unit 108 further changes the color of the furniture for which the reading of the pieces of tag information of all the arranged products is completed (reading completion furniture) on the furniture map. That is, the control unit 108 changes the display color of the read completion furniture to a color (third color) different from the colors of the reading incompletion furniture and the furniture to be read on the furniture map (S407). Here, the reading completion furniture is furniture for which the reading of 90% or more of the products estimated to belong to the furniture, preferably all the pieces of tag information is completed.

Thereafter, the control unit 108 determines whether or not the number of pieces of reading completion furniture is equal to or greater than a threshold value (S408). Here, the threshold value may be set by the user, but is preferably 90% or more of the total number of pieces of furniture arranged in the store. When the number of pieces of reading completion furniture is equal to or greater than the threshold value in S408 (Yes), the control unit 108 displays a numerical value indicating the reading progress in blue on the screen (progress screen) showing the reading progress with respect to the total number of pieces of furniture arranged in the store (S409). On the other hand, when the number of pieces of reading completion furniture is not equal to or greater than the threshold value in S408 (No), the control unit 108 displays the numerical value indicating the reading progress in yellow on the progress screen (S410).

Thereafter, the control unit 108 determines whether or not an instruction to transmit the read information to the server 200 is input by the user (S411). When the transmission instruction is not input in S411 (No), the control unit 108 repeats S404 to S410 until the transmission instruction is input. On the other hand, when the transmission instruction is input in S411 (Yes), the control unit 108 outputs (transmits) the identification information of the product and the identification information of the furniture in association with each other to the server 200 via the communication unit 105 (S412).

The control unit 108 displays a transmission result screen on the display unit 106 (S413). The transmission result screen includes the number of pieces of reading completion furniture included in the transmitted information. When the number of pieces of reading completion furniture included in the transmitted information is equal to or greater than the threshold value of S408, the control unit 108 determines that the current scan is a full scan, and transmits an instruction to update all the pieces of information on the floor map to the server 200. On the other hand, when the number of pieces of reading completion furniture included in the transmitted information is less than the threshold value of S408, the control unit determines that this scan is a partial scan, and transmits an instruction to update only a part of the information on the floor map to the server 200.

In the scanning system 1000, the scan according to the flow of FIG. 4 using the scanner 100 may be performed periodically or aperiodically. However, when the full scan of scanning most of the floor of the store is performed periodically at a first frequency (for example, once a day before opening), the partial scan of scanning a region (a part of the floor of the store) narrower than in the full scan is preferably performed at a second frequency (for example, once near noon and once in the evening) higher the frequency in the full scan. The scan may be performed by a plurality of portable scanners 100. When the same tag is read, the scanner 100 and the server 200 are controlled such that the recently read positional information is updated so as to overwrite the old positional information.

Figure 5A:
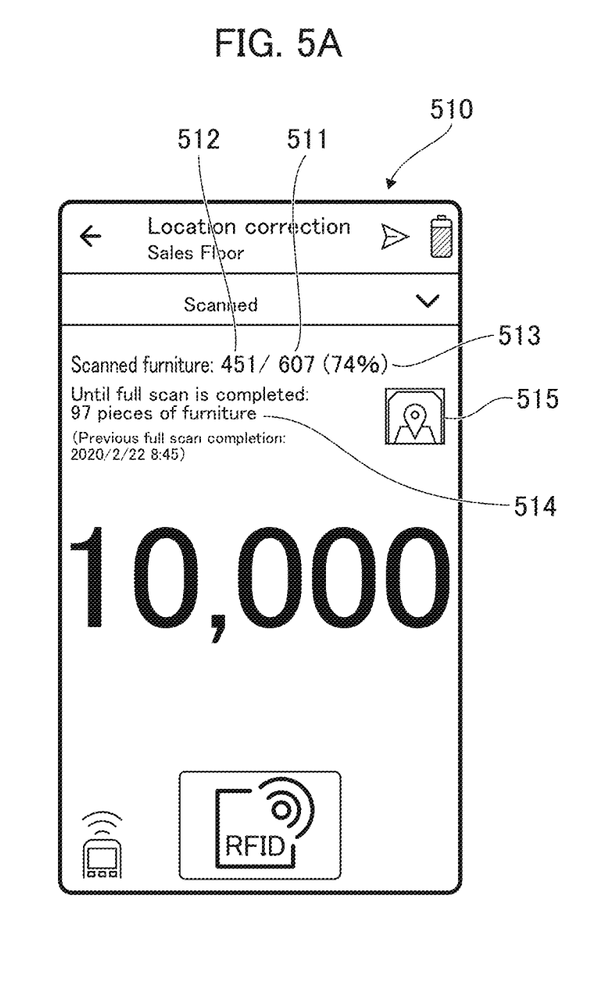
FIG. 5A is a schematic diagram showing an example of a screen showing a reading progress.
Figure 5B:
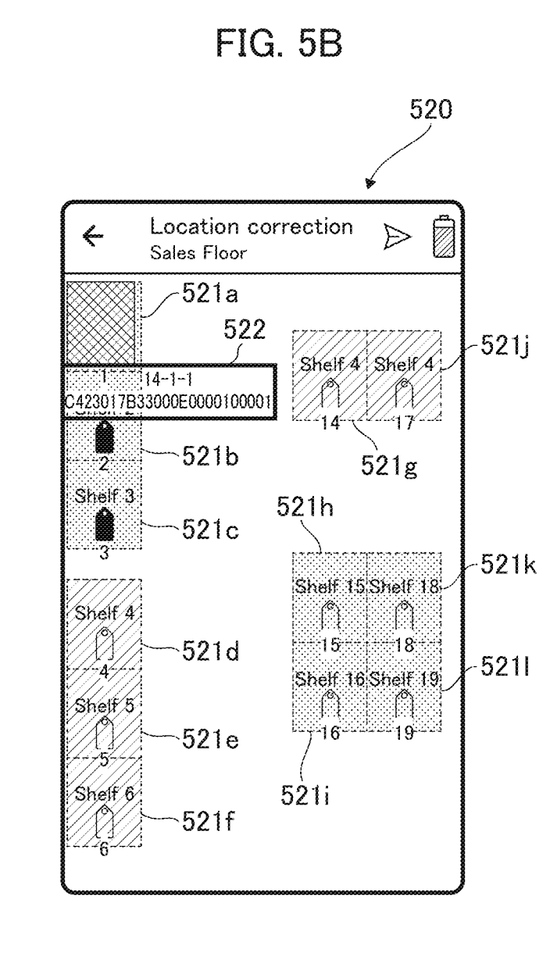
FIG. 5B is a schematic diagram showing an example of a furniture map screen.

FIGS. 5A and 5B are schematic diagrams showing an example of a screen display of the scanner 100. These diagrams are a screen to be displayed on the display unit 106 of the scanner 100 when the scanner 100 acquires the pieces of identification information from the products and the pieces of furniture arranged in the store. FIG. 5A is a schematic diagram showing an example of a screen (progress screen 510) showing a reading progress. The total number of pieces of furniture 511 installed in the store and the number of pieces of reading completion furniture 512 at the time of display are included and a progress rate 513 is also displayed on the progress screen 510. The number of pieces of furniture 514 (pieces of reading incompletion furniture) for which the reading is not completed at the time of display is also included in the progress screen 510. These numerical values are displayed in blue, for example, when the number of pieces of reading completion furniture is equal to or greater than the threshold value, and are displayed in yellow, for example, when the number of pieces of reading completion furniture is less than the threshold value. The display color is set to be different depending on whether or not the number of pieces of reading completion furniture is equal to or greater than the threshold value, the user can easily grasp whether or not all the scans are completed. The specific color illustrated here is an example and is not limited thereto. It may be possible to easily grasp whether or not the number of pieces of reading completion furniture is equal to or greater than the threshold value. For example, different icons may be displayed depending on whether or not the number of pieces of reading completion furniture is equal to or greater than the threshold value. The color of the overall screen may be different.

FIG. 5B is a schematic diagram showing an example of a furniture map screen 520. The furniture map screen 520 is displayed by the user selecting an icon 515 for displaying the furniture map which is displayed on the progress screen 510 by tapping or the like. The furniture map screen 520 includes icons 521a to S211 indicating a plurality of pieces of furniture displayed on the floor map of the store, and positions indicated by the icons 521a to S211 correspond to the installation positions of the pieces of furniture in the store. In this diagram, as an example, a screen on which read processing of a tag is being executed for a product disposed in furniture corresponding to the icon 521a is shown. Here, the icons 521d to 521g and the icons 521j indicate the pieces of reading completion furniture, and the icons 521b to 521c, the icons 521h to 521i, and the icons 521k to S211 indicate the pieces of reading incompletion furniture. The control unit 108 displays the icon 521a corresponding to the furniture for which the read processing is being executed in, for example, yellow and also displays identification information 522 of the furniture for which the read processing is being executed. The control unit 108 displays the icons 521d to 521g and the icons 521j corresponding to the pieces of reading completion furniture in a color different from the colors of the pieces of furniture for which the read processing is being executed, for example, gray. The control unit 108 displays the icons 521b to 521c, the icons 521h to 521i, and the icons 521k to S211 corresponding to the pieces of reading incompletion furniture in a different color from the colors of the pieces of furniture for which the read processing is being executed and the pieces of reading completion furniture, for example, green. The icons are displayed in this manner, and thus, the user can intuitively grasp the reading completion furniture and the reading incompletion furniture, and it is possible to improve the efficiency of the read processing.

The user can grasp the pieces of furniture for which the read processing is being executed, the pieces of reading completion furniture, and the pieces of reading incompletion furniture so as to be distinguished from each other. For example, the displays may be different so as to be distinguished from each other by superimposing different icons and symbols or enclosing the icons indicating the pieces of furniture in frames having different colors. These display methods may be combined.

Figure 6A:
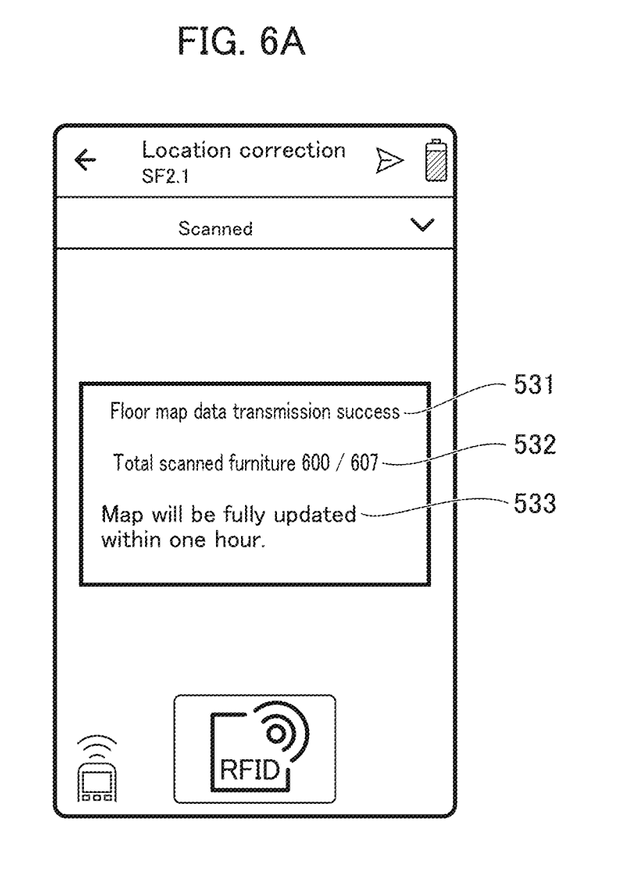
FIG. 6A is a schematic diagram showing an example of a transmission result screen in a full scan.
Figure 6B:
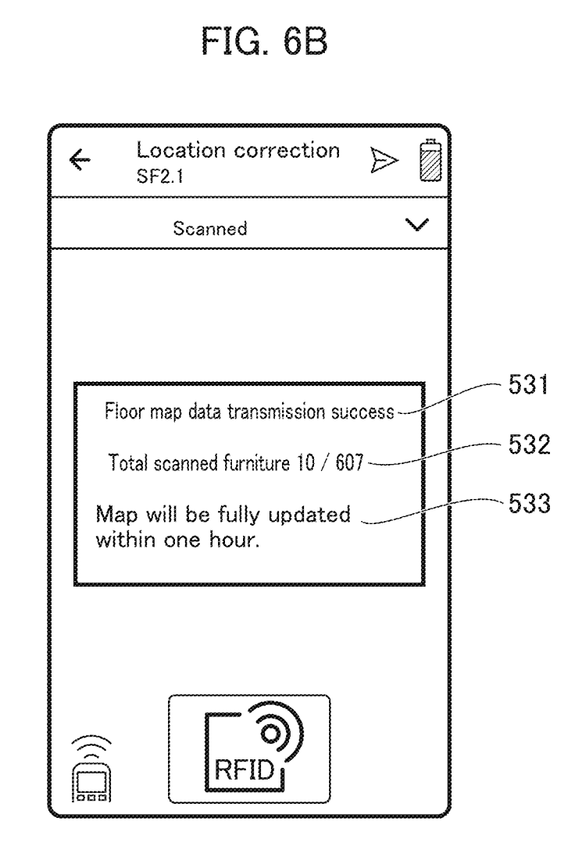
FIG. 6B is a schematic diagram showing an example of the transmission result screen in a partial scan.

FIGS. 6A and 6B are schematic diagrams showing an example of the transmission result screen. The transmission result screen is the screen to be displayed in S413 in the flow of FIG. 4. FIG. 6A is a schematic diagram showing an example of the transmission result screen in the full scan. FIG. 6B is a schematic diagram showing an example of the transmission result screen in the partial scan. The transmission result screen includes a transmission result 531, the number of pieces of reading completion furniture included in the transmitted information, that is, the total number of pieces of scan furniture 532, and information 533 indicating a full update or a partial update. The information 533 indicating the full update or the partial update is the full update when the total number of pieces of scan furniture 532 is equal to or more than a threshold value, and is the partial update when the total number of pieces of scan furniture 532 is less than the threshold value.

Figure 7:
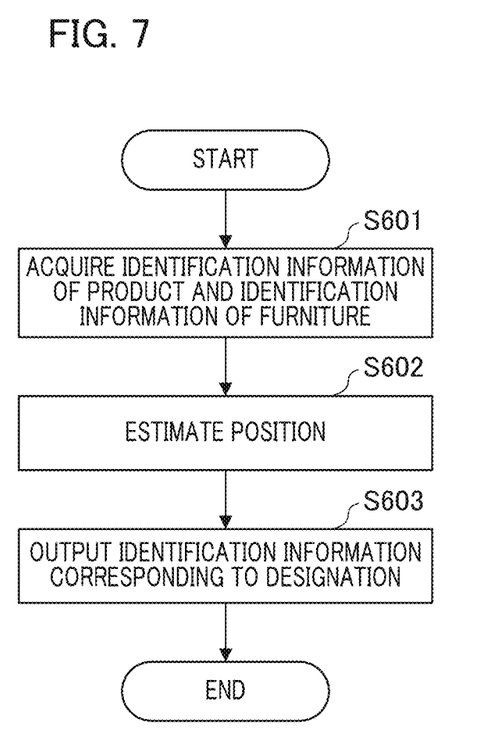
FIG. 7 is a flowchart showing an example of processing in a server.

Next, a flowchart illustrating processing in the server 200 will be described. FIG. 7 is a flowchart showing an example of the processing in the server 200. First, in S601, the communication unit 201 acquires the identification information of the product and the identification information of the furniture associated with the identification information of the product from the scanner 100. At this time, it is desirable to also acquire scan information indicating a time at which the identification information of the product is read. Subsequently, in S602, the conversion unit 202 estimates the position of the product in the store based on the identification information of the product acquired by the communication unit 201 and the identification information of the furniture associated with the identification information of the product. This positional information is converted into the information (display positional information) that can be reflected on the floor map of the store, and is stored in the product information storage unit 203. Thereafter, in S603, the output unit 204 associates the identification information of the product with the positional information of the product and outputs the information to the display device 300 according to the designation in the display device 300.

As described above, according to the present embodiment, in a store such as a clothing store, it is possible to improve the efficiency of scanning the tag of the product displayed in the store.

OTHER EMBODIMENTS

Although the embodiments of the present application have been described in detail with reference to some drawings, the above embodiments are examples for describing the present disclosure, and the present disclosure is not intended to be limited to these embodiments. The present disclosure can be implemented in various forms without departing from the gist thereof. When the processing in the scanner 100 and the server 200 is achieved by a computer, the processing content of the function of each unit of these devices is executed based on the program. The program describing the above-mentioned processing contents can be recorded on a non-transitory computer-readable storage medium. The non-transitory computer-readable storage medium may be, for example, a magnetic recording device, an optical disk, a magneto-optic recording medium, a semiconductor memory, or the like. The processing of each unit may be configured by executing a predetermined program on the computer.

While the embodiment of the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims priority to Japanese Application No. 2020-078972, filed Apr. 28, 2020. The aforementioned application is hereby incorporated by reference herein.

What is claimed is:

1. A scanner scanning a plurality of pieces of furniture on which products are arranged, the scanner comprising:
a reading unit configured to read information from a tag attached to the product;
an estimation unit configured to perform estimation processing of estimating which furniture the tag read by the reading unit belongs to; and
a display control unit configured to display first furniture for which the estimation processing is completed and second furniture for which the estimation processing is not completed to be distinguished from the first furniture on a floor map showing positions of the plurality of pieces of furniture,
wherein the display control unit is configured to display a number of pieces of the second furniture for which the estimation is not completed, and
wherein the display control unit is configured to change the display of the second furniture for which the estimation is not completed when a number of pieces of first furniture for which the estimation is completed exceeds a threshold value.

2. The scanner according to claim 1, wherein the display control unit is configured to display the furniture for which the information is being read and the estimation is being executed distinguished from the first furniture for which the estimation is completed and the second furniture for which the estimation processing is not completed.

3. The scanner according to claim 1, further comprising: a transmission unit configured to transmit the information read by the reading unit to a server, wherein the display control unit is configured to display the number of pieces of furniture for which the estimation is completed when a transmission result of the read information is displayed, and the number of pieces of furniture being included in the transmitted information.

4. The scanner according to claim 1, further comprising: an acquisition unit configured to acquire a latest floor map, wherein the acquisition unit is configured to compare a previously acquired floor map with the latest floor map, and acquire the latest floor map when there is a difference.

5. The scanner according to claim 1, wherein the scanner is a portable type that is carried and movable by a user,
the plurality of pieces of furniture has furniture tags having each unique information,
the reading unit is configured to read information from the furniture tag, and
the estimation unit compares the information read from the tag attached to the product with the information read from the furniture tag, and estimates which furniture the tag attached to the product belongs to.

6. A control method of a scanner for scanning a plurality of pieces of furniture on which products are arranged, the method comprising:
reading information from a tag attached to the product;
performing estimation processing of estimating which furniture the tag read in the reading belongs to;
displaying first furniture for which the estimation is completed and second furniture for which the estimation is not completed to be distinguished from the first furniture,
displaying a number of pieces of second furniture for which the estimation is not completed, and
changing the displaying of the second furniture for which the estimation is not completed when a number of pieces of first furniture for which the estimation is completed exceeds a threshold value.

7. A non-transitory computer readable storage medium storing a program causing a computer to execute a control method of a scanner for scanning a plurality of pieces of furniture on which products are arranged, the method comprising:
reading information from a tag attached to the product;
performing estimation processing for estimating which furniture the tag read in the reading belongs to;
displaying first furniture for which the estimation is completed and second furniture for which the estimation is not completed to be distinguished from the first furniture;
displaying a number of pieces of second furniture for which the estimation is not completed; and
changing the displaying of the second furniture for which the estimation is not completed when a number of pieces of first furniture for which the estimation is completed exceeds a threshold value.

8. A scanning system of a tag that includes the scanner according to claim 1, a server connected to the scanner and able to communicate with the scanner, wherein the server includes a writing unit configured to write information indicating that the product is disposed in a store, on the tag read by the scanner.

9. A scanning system of a tag that includes the scanner according to claim 2, a server connected to the scanner and able to communicate with the scanner, wherein the server includes a writing unit configured to write information indicating that the product is disposed in a store, on the tag read by the scanner.

10. A scanning system of a tag that includes the scanner according to claim 3, a server connected to the scanner and able to communicate with the scanner, wherein the server includes a writing unit configured to write information indicating that the product is disposed in a store, on the tag read by the scanner.

11. A scanning system of a tag that includes the scanner according to claim 4, a server connected to the scanner and able to communicate with the scanner, wherein the server includes a writing unit configured to write information indicating that the product is disposed in a store, on the tag read by the scanner.

12. A scanning system of a tag that includes the scanner according to claim 5, a server connected to the scanner and able to communicate with the scanner, wherein the server includes a writing unit configured to write information indicating that the product is disposed in a store, on the tag read by the scanner.

\* \* \* \* \*